(12) United States Patent
Blair (10) Patent No.: US 6,601,124 B1
(45) Date of Patent: Jul. 29, 2003

(54) UNIVERSAL INTERFACE FOR SELECTIVELY COUPLING TO A COMPUTER PORT TYPE AND METHOD THEREFOR

(75) Inventor: Brian Edward Blair, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,315

(22) Filed: Feb. 14, 2000

(51) Int. Cl.[7] .............................................. G06F 13/00
(52) U.S. Cl. ..................... 710/305; 710/316; 710/63
(58) Field of Search ............................. 710/62–74, 305, 710/316, 317

(56) References Cited

U.S. PATENT DOCUMENTS

| | | | |
|---|---|---|---|
| 5,457,784 A | * 10/1995 | Wells et al. .................. 703/24 |
| 5,734,334 A | 3/1998 | Hsieh et al. |
| 5,832,244 A | * 11/1998 | Jolley et al. .................. 710/16 |
| 5,841,424 A | 11/1998 | Kikinis ....................... 345/168 |
| 5,859,985 A | 1/1999 | Gormley et al. ............. 395/287 |
| 5,884,086 A | 3/1999 | Amoni et al. ........... 395/750.01 |
| 5,896,534 A | 4/1999 | Pearce et al. ................ 395/680 |
| 5,920,734 A | * 7/1999 | Holmdahl .................... 361/601 |
| 5,930,496 A | 7/1999 | MacLaren et al. ........... 395/500 |
| 5,933,656 A | 8/1999 | Hansen ........................ 395/882 |
| 5,938,770 A | 8/1999 | Kim ............................. 713/300 |
| 6,038,630 A | 3/2000 | Foster et al. |
| 6,058,441 A | * 5/2000 | Shu .............................. 710/100 |
| 6,088,754 A | * 7/2000 | Chapman .................... 710/100 |
| 6,247,075 B1 | * 6/2001 | Wang et al. ................. 345/157 |
| 6,260,084 B1 | * 7/2001 | Wilson et al. ............... 101/359 |
| 2001/0016890 A1 | * 8/2001 | Sonoda ........................ 710/129 |
| 2001/0034807 A1 | * 10/2001 | Takaoka et al. ............ 710/131 |

FOREIGN PATENT DOCUMENTS

WO WO 9966415 6/1999

OTHER PUBLICATIONS

*Universal Serial Bus Specification*, Revision 1.1, Copyright Sep. 23, 1998.

* cited by examiner

*Primary Examiner*—Sumati Lefkowitz
(74) *Attorney, Agent, or Firm*—J. Bruce Schelkopf; Winstead Sechrist & Minick (57) ABSTRACT

Provided is an universal Interface that is electrically coupled and physically embedded in a peripheral device. The universal Interface allows the peripheral device to be electrically coupled to a host computer having either a universal Serial Bus (USB) port or Legacy RS232 or RS485 ports, thus allowing a single product for different types of serial buses that are presently being sold within the market place.

7 Claims, 6 Drawing Sheets

UNIVERSAL INTERFACE FOR SELECTIVELY COUPLING TO A COMPUTER PORT TYPE AND METHOD THEREFOR

CROSS-REFERENCE TO RELATED APPLICATION

The present application is related to copending U.S. patent application Ser. No. 09/510,947, which is hereby incorporated by reference herein.

TECHNICAL FIELD

The present invention relates to a universal interface for coupling to a host computer port type of a host computer system.

BACKGROUND INFORMATION

Personal computers ("PCs") use a variety of techniques for providing input and output via peripheral devices. In the past, the PCs have included a serial port, usually an RS232 or RS485, and a parallel port in several ISA expansion slots included on the motherboard. Connecting the PCs to anything more complicated than a mouse, modem or printer usually required the lid to be taken off the PC, dip switches to be set, and software configured. A SCSI (small computer systems interface) device permitted access to external storage devices, but required a large cable connector with the need to manually set ID numbers and have a terminal.

The universal serial bus ("USB") is specified to be a new industry standard extension to the PC architecture with a focus on computer telephony interface, consumer and productivity applications. The USB architecture provides for ease of use for peripheral expansion, transfer rates up to twelve megabits per second, protocol flexibility for mixed modes, isochronous data transfers, and asynchronous messaging and has begun to replace earlier generational serial interfaces such as RS485. USB is a cable bus supporting data transfer between the host PC and a range of simultaneously operable peripherals. One host controller can support up to 127 physical devices using a tiered star topology. The hub is at the center of each star with each wire segment creating a point-to-point connection of up to five meters. The five meter limitation may be between a host and hub or a hub function or a hub connected to another hub or function.

As the point of sale industry begins the transition to USB architecture instead of legacy RS232 or RS485 or other custom interfaces, a problem exists because manufacturers need to produce two sets of similar peripheral devices—one device for use with a PC with USB architecture, and a second, similar device for use with a host computer with RS485 architecture. Therefore, equipment suppliers are faced with manufacturing two sets of similar products that will be sold and co-exist in the field for some period of time after the introduction of USB.

Thus, a need exists in the art where one device or peripheral can be sold so that it may be operably connected to a host computer having either a USB or RS485 or other serial bus capabilities. This unresolved problem and deficiency is clearly felt in the art and is solved by the invention in the manner described below.

SUMMARY OF THE INVENTION

The foregoing need is addressed by the present invention which provides an universal interface, electrically connected to a peripheral device, comprising a first or a second cable type for coupling the universal interface to a host computer, circuitry for sensing a voltage presented at the first or second port type, and circuitry for establishing a first or second data communications link between the host computer and the peripheral device via the universal interface in response to the voltage sensed.

Additionally, the present invention provides a data processing system comprising a host computer with either a first or second communications bus, a universal interface coupled to a first or second port type of the host computer, circuitry for determining a first or second voltage at the respective port, and circuitry for establishing the proper data communications path between the host computer, universal interface and peripheral device connected thereto.

Finally, the present invention provides a methodology for selectively enabling one of two interface logic circuits when a universal interface is coupled to a host computer.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific voltages and currents to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Within the following description, a standard USB connector, receptacle, plug and signaling all refer to the USB architecture described within the "*Universal Serial Bus Specification,*" Revision 1.1 Copyright Sep. 23, 1998 which is hereby incorporated by reference herein. While an embodiment of the invention will be illustrated using the USB or RS485 host system with just a change of cable to fit the respective form factors of the USB or RS485 connectors, those skilled in the art will understand that several of the concepts of the disclosure could be extended to create devices capable of working with other sets of interfaces as well, such as USB/ RS232 or USB/ PS-2 mouse. For the purposes of demonstrating the embodiment described below, USB and RS485 are used as the primary example.

Figure 1:
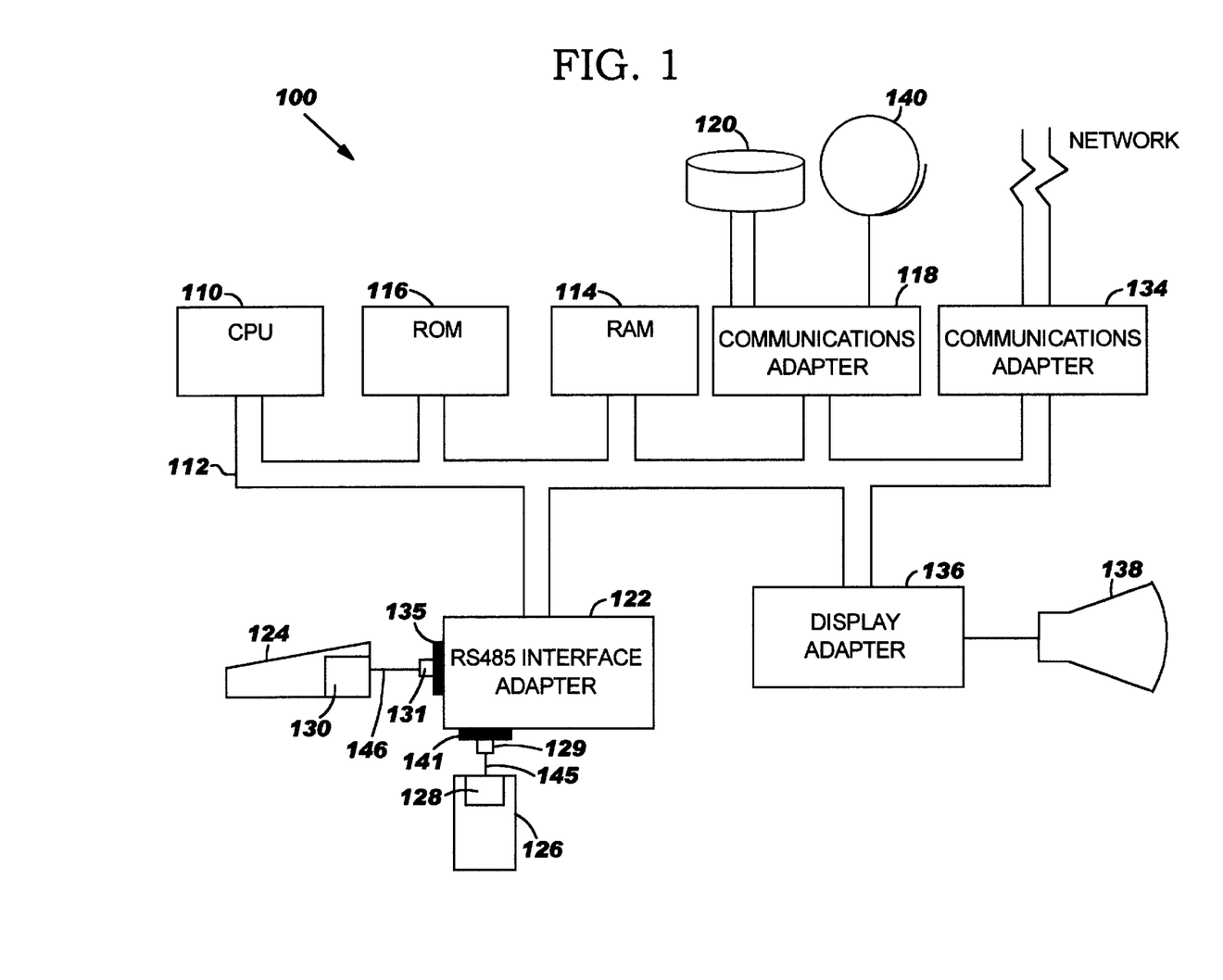
FIG. 1 illustrates a data processing system implementing one embodiment of the present invention using a RS485 data bus.

Referring first to FIG. 1, an example is shown of a data processing system 100 which may be used for the invention. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via RS485 interface adapter 122 and display adapter 136. Keyboard 124 and mouse 126 are interconnected to bus 112 via RS485 interface adapter 122. Keyboard 124 is electrically coupled to RS485 interface adapter 122 via a universal interface 130 and plug 131, cable 146 and port type 135 which is an RS485 port type. Cable 146 is interface specific. Likewise, mouse 126 is electrically coupled to RS485 interface adapter via universal interface 128 and plug 129, cable 145 and port type 141 which is an RS485 port type. Cable 145 is interface adapter specific. It is important to note that universal interfaces 128 and 130 are physically located on and electrically coupled to their respective peripherals. Display monitor 138 is connected to system bus 112 by display adapter 136. In this manner, a user is capable of inputting to the system throughout the keyboard 124 or mouse 126 and receiving output from the system via display 138.

Figure 2:
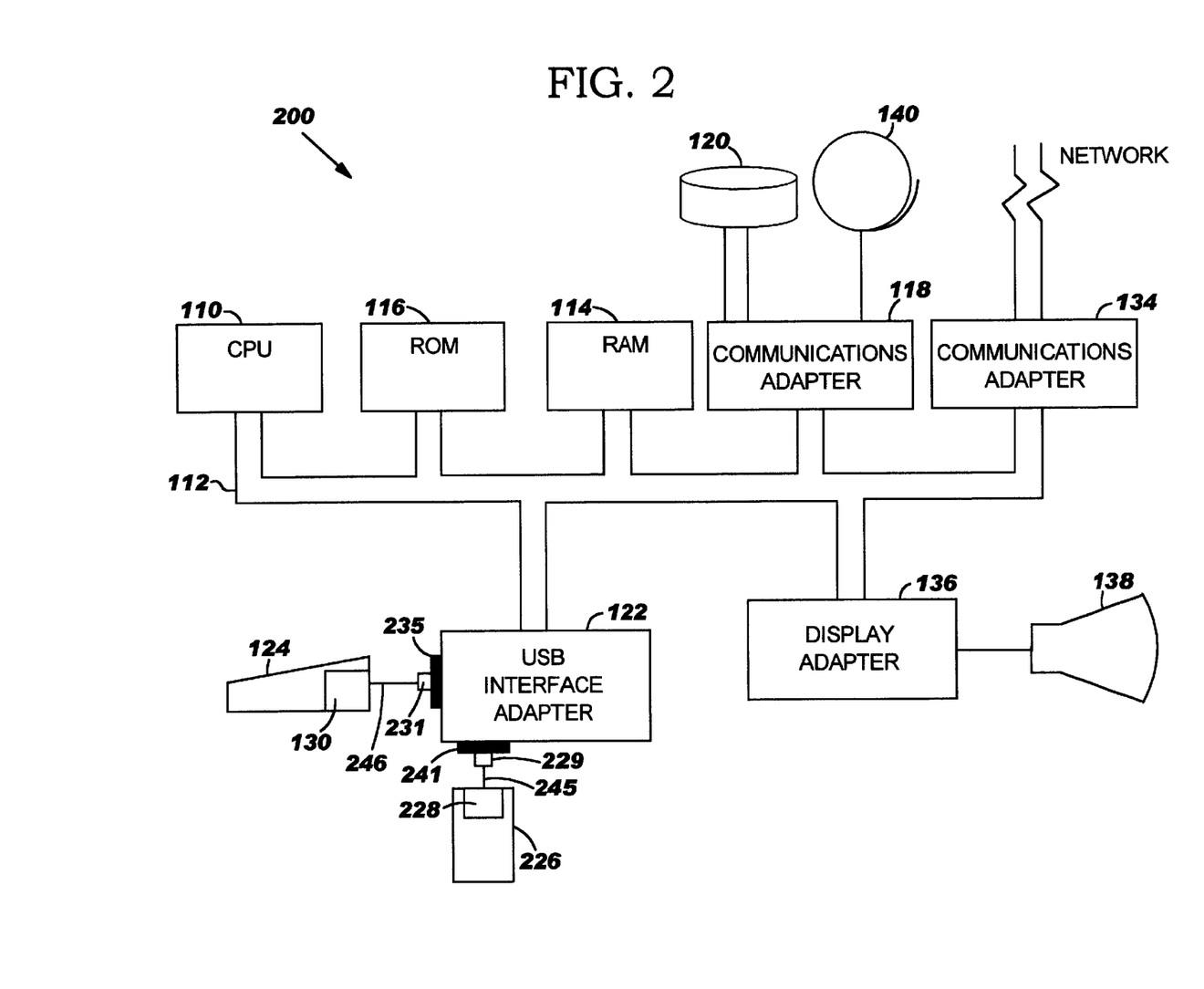
FIG. 2 illustrates a data processing system implementing one embodiment of the present invention using an USB data bus.

Referring to FIG. 2, an example is shown of a data processing system 200 which may be used for the invention. All components of data processing system 100 are shown in data processing system 200, with the exception that RS485 interface adapter 122, and plugs 129 and 131 have been replaced to reflect a USB interface adapter. Therefore, Input/Output devices are connected to system bus 112 via USB interface adapter 222. Keyboard 124 and mouse 126 are interconnected to bus 112 via USB interface adapter 222. Keyboard 124 is electrically coupled to USB interface adapter 222 via a universal interface 130 and plug 231, cable 246 and port type 235 which is an USB port type. Cable 246 is interface adapter specific. Likewise, mouse 126 are electrically coupled to USB interface adapter via universal interface 128 and plug 229, cable 245 and port type 241 which is an USB port type. Cable 245 is interface adapter specific. It is important to note that universal interfaces 128 and 130 are physically located on and electrically coupled to their respective peripherals.

Figure 3:
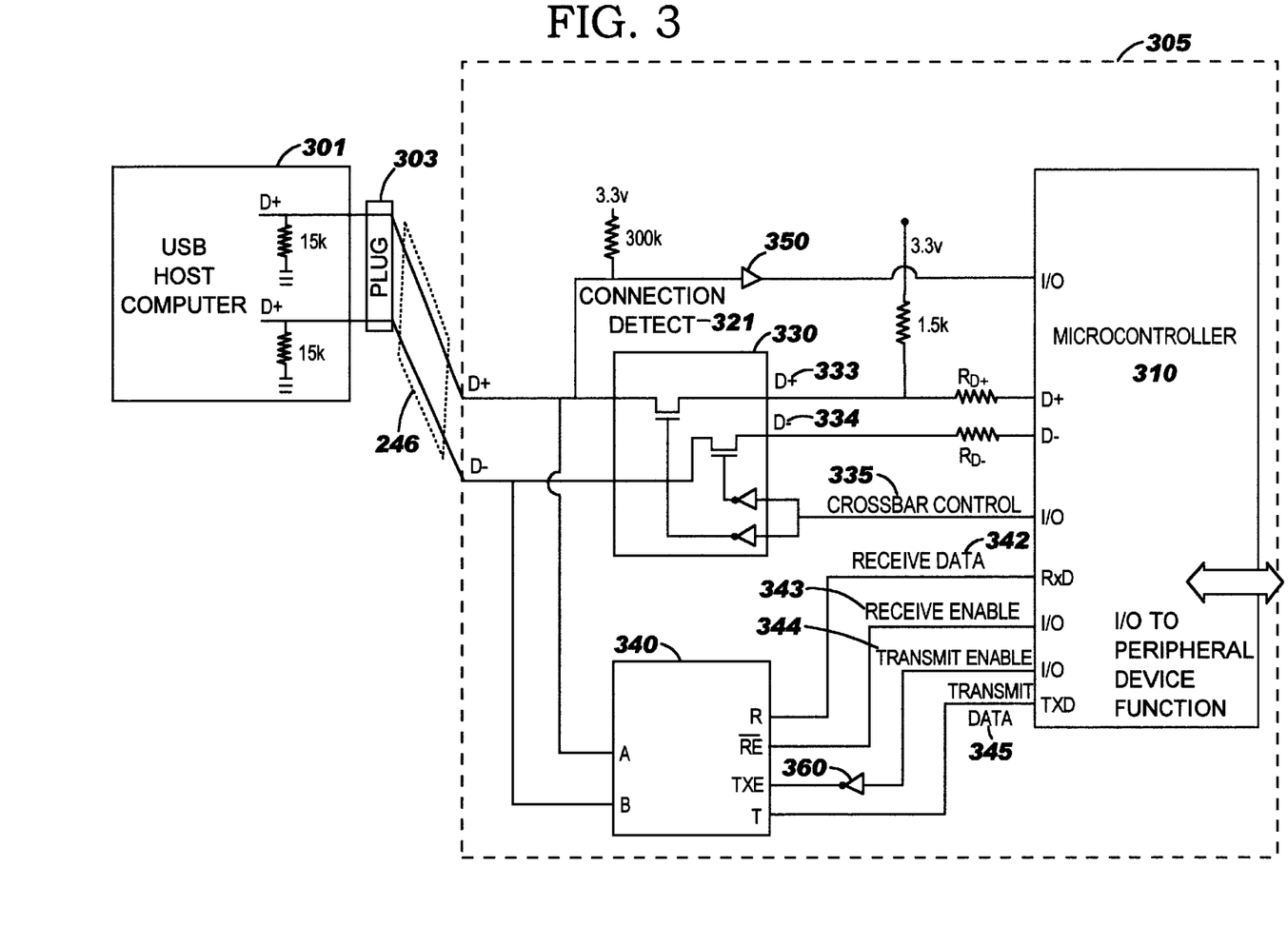
FIG. 3 illustrates a universal interface connected to a USB host computer.

Referring to FIG. 3, there is illustrated one embodiment of the present invention. Universal interface 305 is connected to a host 301 computer that operates with a USB bus and is connected to the peripheral device, such as mouse 126, that will transmit or receive input/output signals via the universal interface 305 to or from the host computer 301. Universal interface 305 shows circuitry and firmware that performs the methodology to determine which type of host system the interface 301 is connected thereto and then presents the appropriate data communication interface between the peripheral and the host PC, such that the peripheral may communicate properly with the host PC via the universal interface 305.

Universal interface 305 includes a microcontroller 310 with both an embedded USB SIE (serial interface engine) and an embedded UART (universal asynchronous receiver transmitter). Microcontrollers 310 also has general purpose input/output pins. An example part for microcontroller 310 is Intel 8X930AX. Low Dropout Linear Regulator 320 provides 3.3 volts for USB. Those familiar with the design and specification of both USB and RS485 buses are familiar with the USB requirement for the 3.3 volts in design while RS485 requires a 5 volt technology.

Crossbar Switch 330 allows connectivity between the peripheral device and the USB host computer when operating in USB mode. An example part is Texas Instruments SN74CBT3306 Dual FET Bus Switch. RS485 Transceiver 340 operates to permit RS485 operations when the universal device is connected to an RS485 host computer. An example part is Texas Instruments TL3695. CMOS Buffer 350 maintains a high impedance on the Connection Detect line 321. The need for the high impedance on the Connection Detect line 321 will be discussed below. An example part of CMOS Buffer 350 is Texas Instruments T174HC4050. Inverter 360 is used in conjunction with RS485 Transceiver and may be any commonly found TTL inverter. Resistors RD+ and RD− are resistors which are adjusted from normal values to account for resistance of the Crossbar Switch. This is a fixed adjustment selected by engineering during development. Additionally, the 1.5 K resistor 322 connected between the Low Dropout Linear Regulator 320 and the D+ line 333 is shown for a high speed USB device and thus it and the Connection Detect line 321are aligned to the D+ line 333. As those skilled in the art recognize, the present invention can also work for a low speed device by moving the 1.5 K resistor 322 and Connection Detect line 321 to the D− wiring 334. Further, as discussed above the invention can be extended such that instead of an RS485, the interface 305 could support any data communication where the bus supports other bus standards known in the art.

The universal interface 305 is in the "power-on" logic state, when plug 303, which is attached to a USB cable type is coupled to USB host 301, or when the universal interface 305 is coupled to the host and the host is subsequently powered up. The 3.3 volt output is in a high impedance state. Also, the Connection Detect input 321 maintains a high impedance state through the operation of CMOS Buffer 350. CMOS Buffer 350 operates to ensue the impedance must be high enough so that the Connection Detect line 321 will not have an effect on USB options once proper coupling and USB "start up" sequences have occurred. Further, both Receive Enable 343 and Transmit Enable 344 of the RS485 Transceiver 340 are disabled. Therefore, the outputs of the RS485 Transceiver 340 are in a high impedance state. Finally, the two-way Crossbar Logic Switch 330 controlling distribution of D+333 and D−334 to the USB serial engine located in host computer 301 is disabled in both directions.

Upon connection of the universal interface 305 to the host computer 301 when plug 303 is coupled to the USB host computer port 302, the Connection Detect line 321 senses the coupling by sensing the D+ voltage line 333. This sensed voltage is read by microprocessor 310 and found to be at a zero logic state. Those familiar with USB operations will understand that this logic state is in accordance with the Universal Serial Bus specification as set forth above. Upon microcontroller 310 receiving an input at the Connection Detect line 321 of a zero logic state, the microcontroller 310 enables the two-way Crossbar Switch 330 through the Crossbar Control line 335. This allows the USB device to become "connected." Once the USB interface becomes "connected," a data communications link is established between the host computer 301 and the peripheral device via the universal interface 305. USB data communications may proceed normally through the universal interface 305 as the connected peripheral transmits or receives data communications through the universal interface 305 to or from the host computer 301. During the entire startup connection to the USB host, the RS485 Transceiver 340 is maintained in a disabled state, maintaining the outputs of the RS485 Transceiver 340 in a high impedance state and thus not affecting the USB operations.

Figure 4:
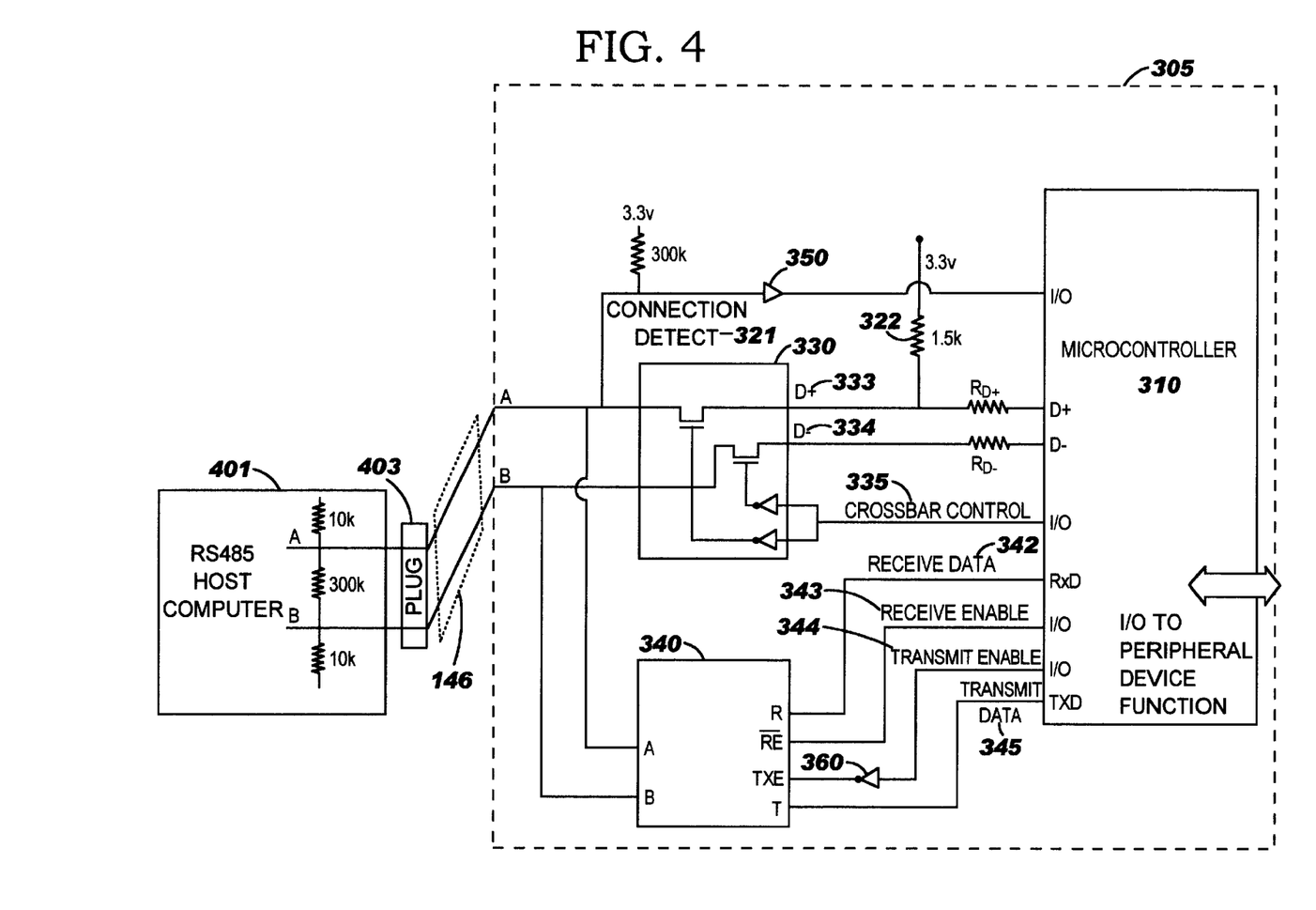
FIG. 4 illustrates a universal interface connected to a RS485 host computer.

Referring now to FIG. 4, there is illustrated an example of the universal interface 305 when coupled to a RS485 host computer 401. The universal interface 305 is in the "power-on" logic state, when plug 403, which is attached to a RS485 cable type is coupled to PS485 host 401, or when the universal interface 305 is coupled to the host and the host is subsequently powered up. The component parts for the universal interface 305 described here in FIG. 4 are the same as in FIG. 3 except that plug 403, is attached to a RS485 cable type such as cable 146 in FIG. 1

Upon coupling the host computer 401 having an RS485 bus via the host computer port 402 and the universal interface 305 through plug 403, the input Connection Detect line 321 senses the coupling by sensing the voltage at the coupling and sends that signal to microprocessor 310. This sensed voltage equates to the logic state of one or a high impedance. When microprocessor 310 detects a logic state of one or a high impedance by way of the Connection Detect line 321, the two-way Crossbar Logic Switch 330 remains disabled since microcontroller 310 sends no enabling signal to the Crossbar Switch 330 via the Crossbar Control line 335 Next, microprocessor 310 enables RS485 Transceiver 340. Thus, a data communications link is established between the host computer 401 and the peripheral via he universal interface 305 through Transceiver 340. This allows input and output data communications through the universal interface to or from the host computer 401 to the connected peripheral.

It is important to note that while typical resistor values are shown for a RS485 host computer 401, the resistors are optional pursuant to the RS485 standard. Previously, point of sale products have used the 10 K pull up and pull down resistors on the RS485 computer host to prevent oscillation of the RS485 bus output when the host transceiver is not asserted. For an operation on hosts which might not have the optional 10 K pull up/pull down resistors, those skilled in the art will understand that the logic which processes the Connection Detect should have a method of detecting a high impedance state, for example, a large 300 K pull up resistor. If due to timing restrictions or hot plugging applications, the device may not be plugged into the RS485 until after the host computer 401 has already started communications, then a sampling technique must be used to search for logic 1 condition of the Connection Detect signal by microprocessor 310.

Figure 5:
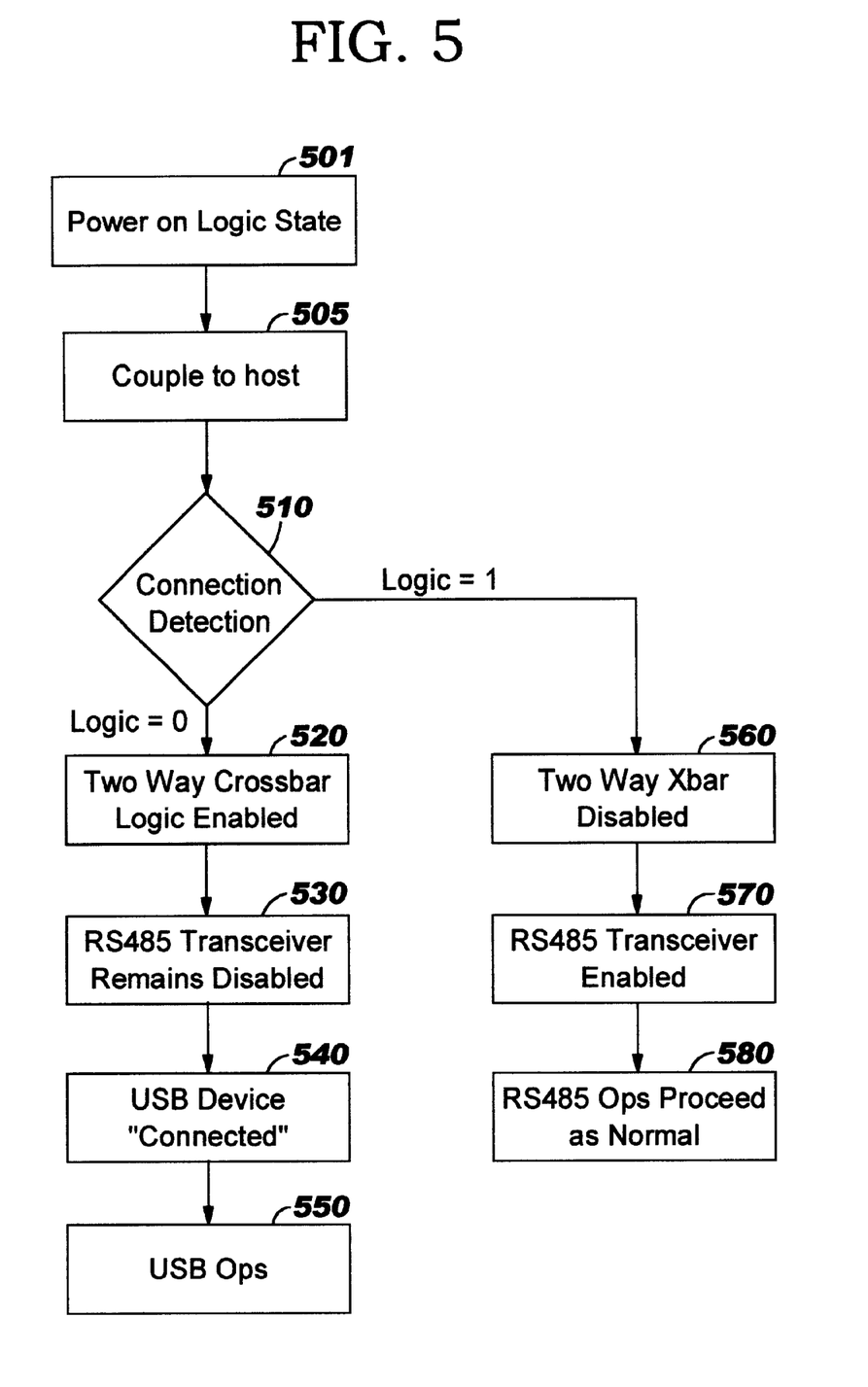
FIG. 5 illustrates a methodology for implementation of the universal interface.

Referring now to FIG. 5, there is illustrated a methodology for selectively determining the host computer's bus characteristics and providing a data communications path via the universal interface for the respective peripheral signals that correspond to the host computer's bus. According to this methodology, immediately after power is applied, the Interface is maintained in a power on logic state at Step 501. Upon coupling the device to a host computer in Step 505, a Connection Detect circuitry 321 senses the host computer's impedance and determines whether the host computer has a high or low impedance in Step 510. If the impedance is low, or a logic state of zero as determined in 510, the two-way Crossbar 330 is enabled in Step 520, while the RS485 Transceiver 340 is maintained in a disabled state in Step 530. This provides that the peripheral device is "connected" in Step 540 via the universal interface in accordance with USB specifications. Once "connected" the peripheral device will operate with the host computer within USB specifications as shown in the Step 550. If in Step 510, the impedance state is high or logic state of one, then the two-way crossbar circuitry is maintained in a disabled state in Step 560. RS485 Transceiver is enabled in Step 570 which allows the RS485 operations to proceed as normal in Step 580.

Figure 6:
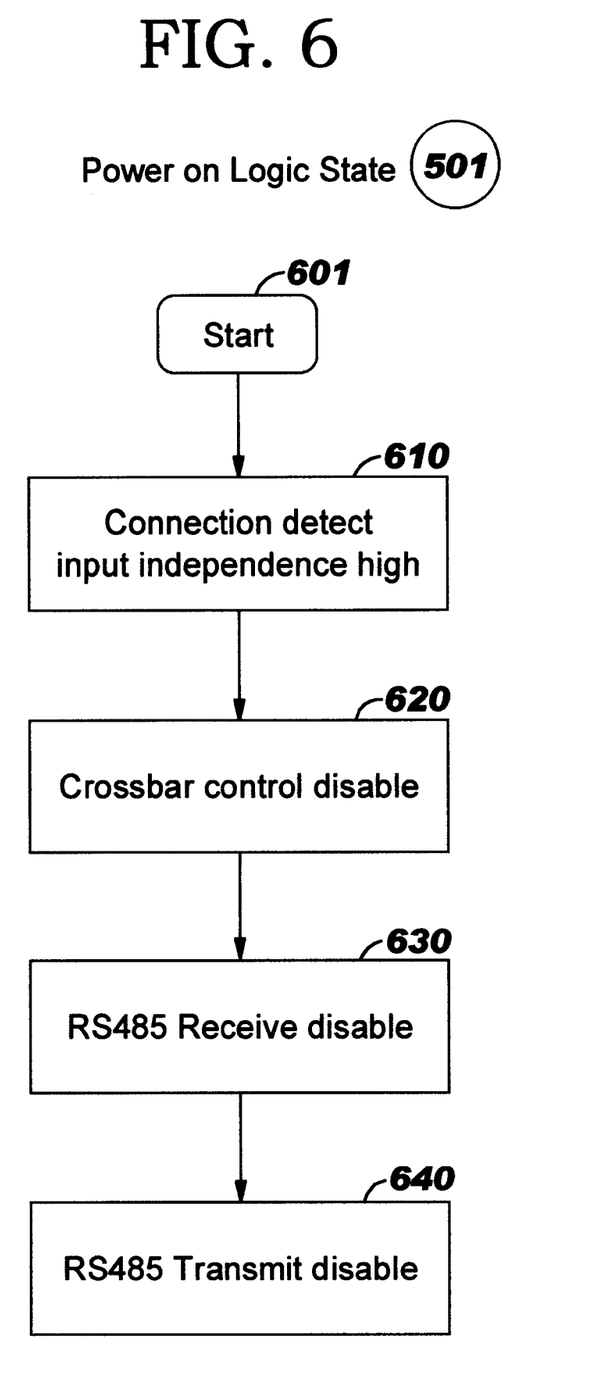
FIG. 6 illustrates a methodology for maintaining a universal interface in a power on logic state.

FIG. 6 illustrates a methodology for establishing a universal interface prior to connection. 501's initial conditions are described in FIG. 1. Step 601 starts the process. First, the Connection Detect 321 input impedance is maintained in a high state in Step 610. The Crossbar Control switch 335 is disabled in Step 620 and the RS485 Transceiver 340 maintains the Receive Enable 343 in disabled state in Step 630 and the Transmit Enable 344 disabled in Step 640.

While the invention has been described in detail herein, in accordance with certain embodiments thereof, modifications and changes therein may be affected by those skilled in the art. Accordingly, it is intended by the appended claims to cover all such modifications and changes as fall within the true spirit and scope of the intention.

Although the present invention and its advantages have been described in detail, it should be understood that various changes, substitutions and alterations can be made herein without departing from the spirit and scope of the invention as defined by the appended claims.

What is claimed is:

1. A universal interface comprising:
a microcontroller;
a detection line coupled to said microcontroller, wherein said detection line is configured to sense a voltage at a port of a host computer coupled to said universal interface;
a crossbar switch coupled to said microcontroller, wherein said crossbar switch is configured to establish a data communication link between said universal interface and a first type port of said host computer, wherein said crossbar switch is enabled to establish said data communication link between said universal interface and said first type port of said host computer upon said detection line sensing a first logic state; and
a transceiver coupled to said microcontroller, wherein said transceiver is configured to establish a data communication link between said universal interface and a second type port of said host computer, wherein said transceiver is enabled to establish said data communication link between said universal interface and said second type port of said host computer upon said detection line sensing a second logic state.

2. The universal interface as recited in claim 1, wherein said first type port is electrically coupled to a universal serial bus.

3. The universal interface as recited in claim 1, wherein said second type port is electrically coupled to a non-universal serial bus.

4. The universal interface as recited in claim 1, wherein said first logic state is a logic slate of zero.

5. The universal interface as recited in claim 1, wherein said second logic state is a logic state of non-zero.

6. The universal interface as recited in claim 1, wherein said universal interface physically resides within a physical embodiment of a peripheral device.

7. The universal interface as recited in claim 6, wherein said peripheral device is a mouse.

* * * * *